(12) United States Patent
Huang et al.

(10) Patent No.: US 8,229,020 B2
(45) Date of Patent: Jul. 24, 2012

(54) INTEGRATED EQUALIZATION AND CDR ADAPTATION ENGINE WITH SINGLE ERROR MONITOR CIRCUIT

(75) Inventors: Dawei Huang, San Diego, CA (US); Muthukumar Vairavan, San Jose, CA (US); Dong Joon Yoon, Santa Clara, CA (US); Drew G. Doblar, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 636 days.

(21) Appl. No.: 12/409,236

(22) Filed: Mar. 23, 2009

(65) Prior Publication Data

US 2010/0238993 A1      Sep. 23, 2010

(51) Int. Cl.
*H04B 15/00* (2006.01)
*H04B 1/10* (2006.01)
*H03K 5/159* (2006.01)

(52) U.S. Cl. .......................... 375/285; 375/233; 375/346
(58) Field of Classification Search .......... 375/229–233, 375/256–257, 259, 278, 284, 295, 316–317, 375/324, 330, 346, 348
See application file for complete search history.

(56) References Cited

U.S. PATENT DOCUMENTS

| | | |
|---|---|---|
| 5,402,448 A | 3/1995 | Marko et al. |
| 6,194,969 B1 | 2/2001 | Doblar |
| 6,219,395 B1 | 4/2001 | Pollack et al. |
| 6,516,422 B1 | 2/2003 | Doblar et al. |
| 6,614,842 B1 * | 9/2003 | Chou et al. ............. 375/232 |
| 6,614,862 B1 | 9/2003 | Doblar |
| 6,731,667 B1 | 5/2004 | Lee et al. |
| 6,937,680 B2 | 8/2005 | Fong et al. |
| 7,006,564 B2 * | 2/2006 | Ling et al. ............. 375/232 |
| 7,263,123 B2 * | 8/2007 | Yousef ............. 375/233 |
| 7,496,298 B2 * | 2/2009 | Chen et al. ............. 398/209 |
| 7,512,191 B2 * | 3/2009 | Laamanen et al. ........ 375/296 |
| 7,636,408 B2 * | 12/2009 | Bau et al. ............. 375/354 |
| 7,920,661 B2 * | 4/2011 | Gaal ............. 375/347 |
| 2002/0191716 A1 * | 12/2002 | Xia et al. ............. 375/341 |

(Continued)

OTHER PUBLICATIONS

"Designing Bang-Bang PLLs for Clock and Data Recovery in Serial Data Transmission Systems"; Richard C. Walker, Agilent Laboratories, Palo Alto, CA; pp. 1-12, IEEE Press, Feb. 2003.

(Continued)

*Primary Examiner* — Lawrence B Williams
(74) *Attorney, Agent, or Firm* — Rory D. Rankin; Meyertons, Hood, Kivlin, Kowert & Goetzel, P.C.

(57) ABSTRACT

A data communications system and methods are disclosed. The system includes a transmitter for conveying a data signal filtered by a finite impulse response (FIR) filter to a receiver via a channel. The receiver equalizes the received data signal using a decision feedback equalizer (DFE) and the FIR. The receiver samples the data signal to determine an error signal and uses the error signal to adapt settings of a pre-cursor tap coefficient of the FIR, one or more post-cursor tap coefficients of the FIR, a phase of the recovered clock, and a coefficient of the DFE. To adapt the settings, the receiver determines the error signal based on an error sample taken from the data signal in a single clock cycle. To determine an error signal, the receiver samples the data signal at a phase estimated to correspond to a peak amplitude of a pulse response of the channel.

23 Claims, 9 Drawing Sheets

U.S. PATENT DOCUMENTS

| | | | |
|---|---|---|---|
| 2007/0019773 A1 | 1/2007 | Zhou | |
| 2007/0223565 A1* | 9/2007 | Gaal | 375/141 |
| 2008/0260016 A1* | 10/2008 | Lapointe et al. | 375/233 |
| 2010/0046598 A1* | 2/2010 | Zhong et al. | 375/233 |
| 2010/0177816 A1* | 7/2010 | Malipatil et al. | 375/233 |

OTHER PUBLICATIONS

"A Second-Order Semi-Digital Clock Recovery Circuit Based on Injection Locking"; M.-J. Edward Lee, William J. Dally, John Poulton, Trey Greer, John Edmondson, Ramin Farjad-Rad, Hiok-Tiaq Ng, Rohit Rathi, and Ramesh Senthinathan; Vilio Communications, Milpitas, CA & Stanford University, Stanford, CA; ISSCC 2003/Session 4/Clock Recovery and Backplane Transceivers/ Paper 4.3; © 2003 IEEE International Solid-State Circuits Conference.

"Computationally Efficient Version of the Decision Feedback Equalizer"; Gupta, R., Kiran, Lee, Edward A., University of California, Berkley; Acoustics, Speech, and Signal Processing, 1999. ICASSP apos;99. Proceedings., 1999 IEEE International Conference; vol. 3, Issue, Mar. 15-19, 1999 pp. 1257-1260.

"Decision-Feedback Equalization of Pulse-Position Modulation on Measured Nondirected Indoor Infrared Channels"; Audeh, Malik D., Kahn, Joseph M., and Barry, John R.; IEEE Transactions on Communications, vol. 47, No. 4, Apr. 1999; pp. 500-503.

"Timing Recovery in Digital Subscriber Loops"; Agazzi, Oscar, Tzeng, Chin-Pyng Jeremy, Messerschmitt, David G., and Hodges, David A.; IEEE Transactions on Communications, vol. Com-33, No. 6, Jun. 1985, pp. 558-569.

"Matched Filtering and Timing Recovery in Digital Receivers"; Litwin, Louis; RF Time and Frequency; www.rfdesign.com ; Sep. 2001; pp. 32-48.

"A 4.8-6.4-Gb/s Serial Link for Backplane Applications Using Decision Feedback Equalization"; Balan, Vishnu, et al.; IEEE Journal of Solid-State Circuits, vol. 40, No. 9, Sep. 2005; pp. 1957-1967.

\* cited by examiner

INTEGRATED EQUALIZATION AND CDR ADAPTATION ENGINE WITH SINGLE ERROR MONITOR CIRCUIT

BACKGROUND OF THE INVENTION

1. Field of the Invention

This invention relates to clock and data recovery circuits and, more particularly, to techniques for clock and data recovery.

2. Description of the Related Art

High-speed data communication systems frequently rely on clock and data recovery (CDR) circuits within the receiver instead of transmitting a reference clock with the data. For example, serial data communications may include the use of serializer-deserializer (SERDES) elements at each end of a communications link. Within a SERDES, a CDR may extract a clock that is embedded in the incoming data stream. Once a clock is recovered, it is used to sample the incoming data stream to recover the individual bits. A variety of clock recovery circuits are well known, including phase-locked loops (both analog and digital) and delay lock loops. Regardless of the circuit used, a clock recovery circuit attempts to extract the frequency and phase of the clock from a data stream.

During propagation, data signals may experience distortion due to bandwidth limitations, dispersion, etc. in the communication channel. These effects cause a spreading of signal pulse energy from one symbol period to another. The resulting distortion is known as inter-symbol interference (ISI). Generally speaking, ISI becomes worse as the speed of communication increases. As a result, high-speed communication systems often incorporate circuitry to equalize the effects of ISI. One technique for reducing the effect of ISI is to use a Finite Impulse Response (FIR) filter in the transmitter to equalize the signal before transmitting it through the communication channel. Various parameters of the FIR determine the effect the FIR has on the signal. Various properties of the communications channel determine the appropriate settings of these FIR parameters. For example, signals passing through a communication channel may be affected by electrical properties as well as the temperature and humidity of the channel. Some of these properties may vary during operation, suggesting a need to vary FIR parameters during operation to maintain proper ISI equalization, particularly at high communication speeds.

Another equalization technique involves using a decision feedback equalizer (DFE) in the receiver. DFE's produce an equalized data stream as follows. A clock recovered from the data is used to sample the data at regular intervals. The output of the sampler, which constitutes the retimed data, is stored in a series of latches. The input of the sampler includes the original data plus the individually weighted outputs from each latch. The weights are determined adaptively by analyzing the resulting data stream. Over time, the DFE is expected to produce a stable set of weights that equalize ISI. In order to function properly, the DFE requires a stable recovered clock.

To recover a stable clock, one type of CDR uses an algorithm known as the Muller-Mueller algorithm. Performance of the Muller-Mueller algorithm is improved if the received signal is equalized before being sampled. There are multiple approaches to equalization and CDR adaptation. One approach is edge-based sampling of a received data signal. In edge-based sampling, the received data signal is sampled at a time when the data is transitioning between bits. Edge-based sampling is often preferred for CDR adaptation. Unfortunately, edge-based sampling techniques generally increase the number of samples that must be taken in each cycle. More sampling per cycle increases the circuitry required and the power consumption of SERDES elements. Another error-monitoring approach is symbol-based sampling in which samples may be taken at a time when the data is not transitioning between bits, i.e. in mid-symbol. Mid-symbol sampling may be preferred for DFE and FIR adaptation. Unfortunately, most current error-monitoring implementations require both mid-symbol and edge-based sampling, increasing circuitry and power consumption in a SERDES. Alternatively, protocol-specific adaptation may be achieved by sending a special pattern of bits through the communications link that is used to tune the CDR and DFE elements. Unfortunately, these techniques only adapt the link for specific communications protocols.

In addition to the above considerations, during adaptation, CDR, DFE, and FIR elements may interact with each other, complicating the process of achieving optimal settings. In view of the above considerations, what are needed are systems and methods of efficiently adapting equalization values of FIR, DFE, and CDR parameters.

SUMMARY OF THE INVENTION

Various embodiments of a data communications system and method are disclosed. In one embodiment, a data communications system includes a transmitter for conveying a data signal filtered by a finite impulse response filter (FIR) filter to the receiver via a channel. The receiver receives the data signal via the channel and recovers a clock from the data signal. The receiver equalizes the received data signal using a decision feedback equalizer (DFE) and the FIR. The receiver samples the data signal to determine an error signal and uses the error signal to adapt settings of a pre-cursor tap coefficient of the FIR, one or more post-cursor tap coefficients of the FIR, a phase of the recovered clock, and a coefficient of the DFE. To adapt the settings, the receiver determines the error signal based on an error sample taken from the received data signal in a single clock cycle.

In one embodiment, the error signal includes a measurement of an amount of inter-symbol interference within the data signal received via the channel. To determine an error signal, the receiver samples the data signal received via the channel at a phase estimated to correspond to a peak amplitude of a pulse response of the channel. The phase is based on the recovered clock. In a further embodiment, for each setting, the receiver integrates a quantity derived from multiple error samples, each error sample taken from the received data signal in a single clock cycle.

In a still further embodiment, the receiver adapts the post-cursor tap coefficient of the FIR and the coefficient of the DFE based on one quantity. In a still further embodiment, the receiver increases a pre-cursor tap coefficient setting in response to determining that the phase corresponds to a point earlier than the peak amplitude of the pulse response of the channel and decreases a pre-cursor tap coefficient setting in response to determining that the phase corresponds to a point later than the peak amplitude of the pulse response of the channel. In a still further embodiment, the receiver is integrated into a serializer/deserializer.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
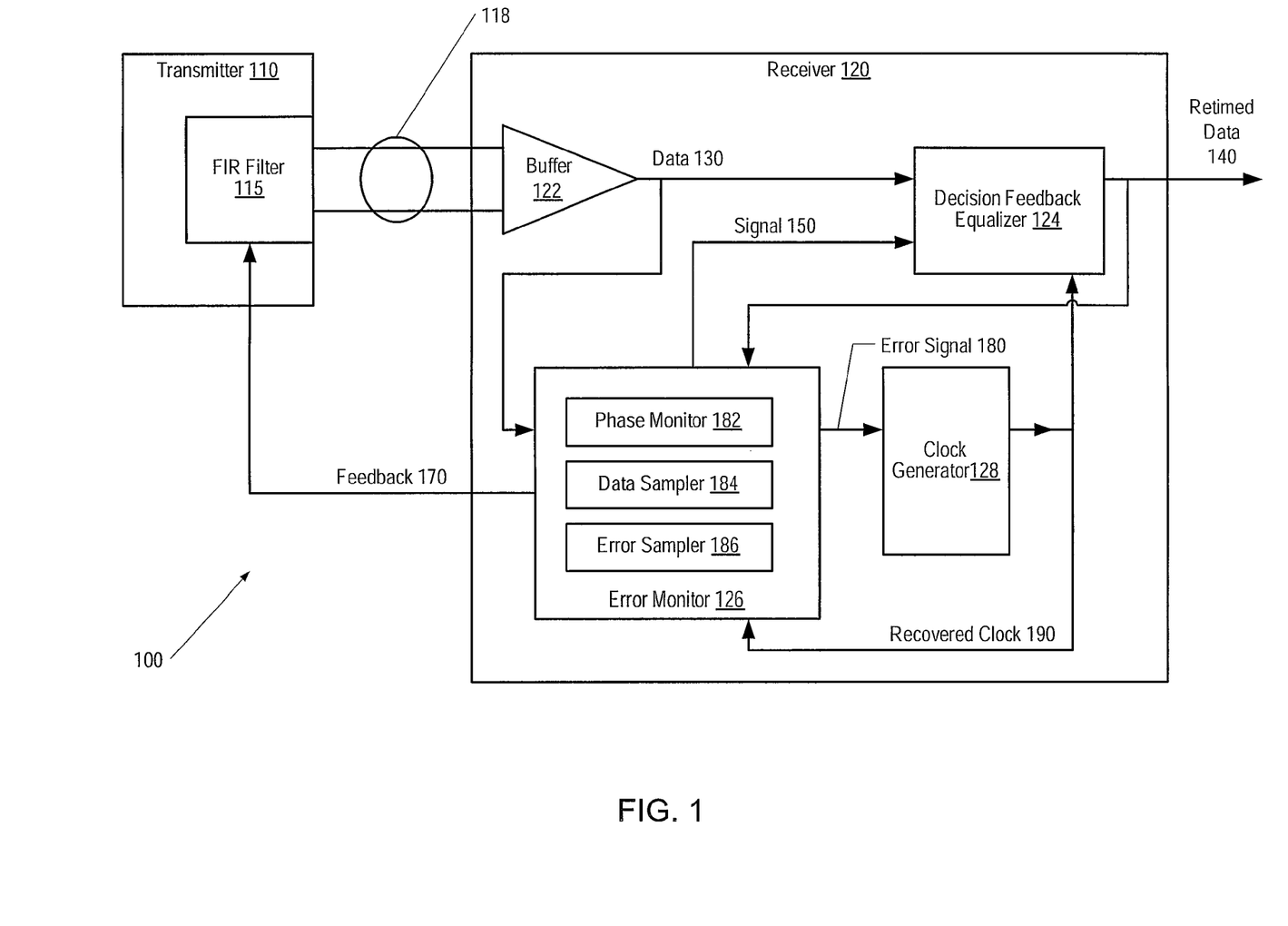
FIG. 1 is a generalized block diagram of one embodiment of a communications system.

FIG. 1 is a generalized block diagram of one embodiment of a communications system 100. System 100 includes a transmitter 110 and a receiver 120 connected by a channel 118. In one embodiment, transmitter 110 and/or receiver 120 may form part of serializer-deserializer (SERDES) circuitry. In one embodiment, channel 118 may be a differential channel. Transmitter 110 may include a finite impulse response filter (FIR) 115 that may be used to equalize signals transmitted through channel 118. In one embodiment, receiver 120 may include a buffer 122, a decision feedback equalizer (DFE) 124, an error monitor 126, and a clock generator 128. Receiver 120 may generate a feedback 170 including one or more signals that are used to set values of parameters within filter 115. Various embodiments of filter 115 and receiver 120 are described below.

During operation, buffer 122 within receiver 120 may receive a data signal via channel 118. Buffer 122 may convert the received data signal to output data 130, which may be conveyed to DFE 124 and to error monitor 126. In one embodiment, buffer 122 may perform automatic gain control to establish a working voltage level for data 130. For example, buffer 122 may include a variable gain amplifier (VGA) configured to set the average amplitude of data 130 to a configurable value. In one embodiment, error monitor 126 includes a phase monitor 182, a data sampler 184, and an error sampler 186. One embodiment of each of these elements will be described in detail below. In general, error monitor 126 may include circuitry for generating an error signal 150 that may be used to control settings within DFE 124, and feedback 170 for controlling settings within FIR filter 115. Error monitor 126 may also include circuitry for generating an error signal 180 that may be used by clock generator 128 to recover a clock signal. Clock generator 128 may convey a recovered clock 190 to both DFE 124 and error monitor 126. DFE 124 may be configured by signal 150 and recovered clock 190 to equalize data 130, producing retimed data 140. In one embodiment, retimed data 140 may be fed back to error monitor 126 establishing a closed loop between error monitor 126 and DFE 124.

A number of alternative embodiments are possible in which receiver 120 includes other components instead of or in addition to those illustrated. Also, each of the illustrated components may include other features not shown. For example, error monitor 126 may include a phase-locked loop and//or other circuitry suitable for recovering a clock signal. Clock generator 128 may generate additional clock outputs that are used in alternative versions of error monitoring circuitry.

Figure 2:
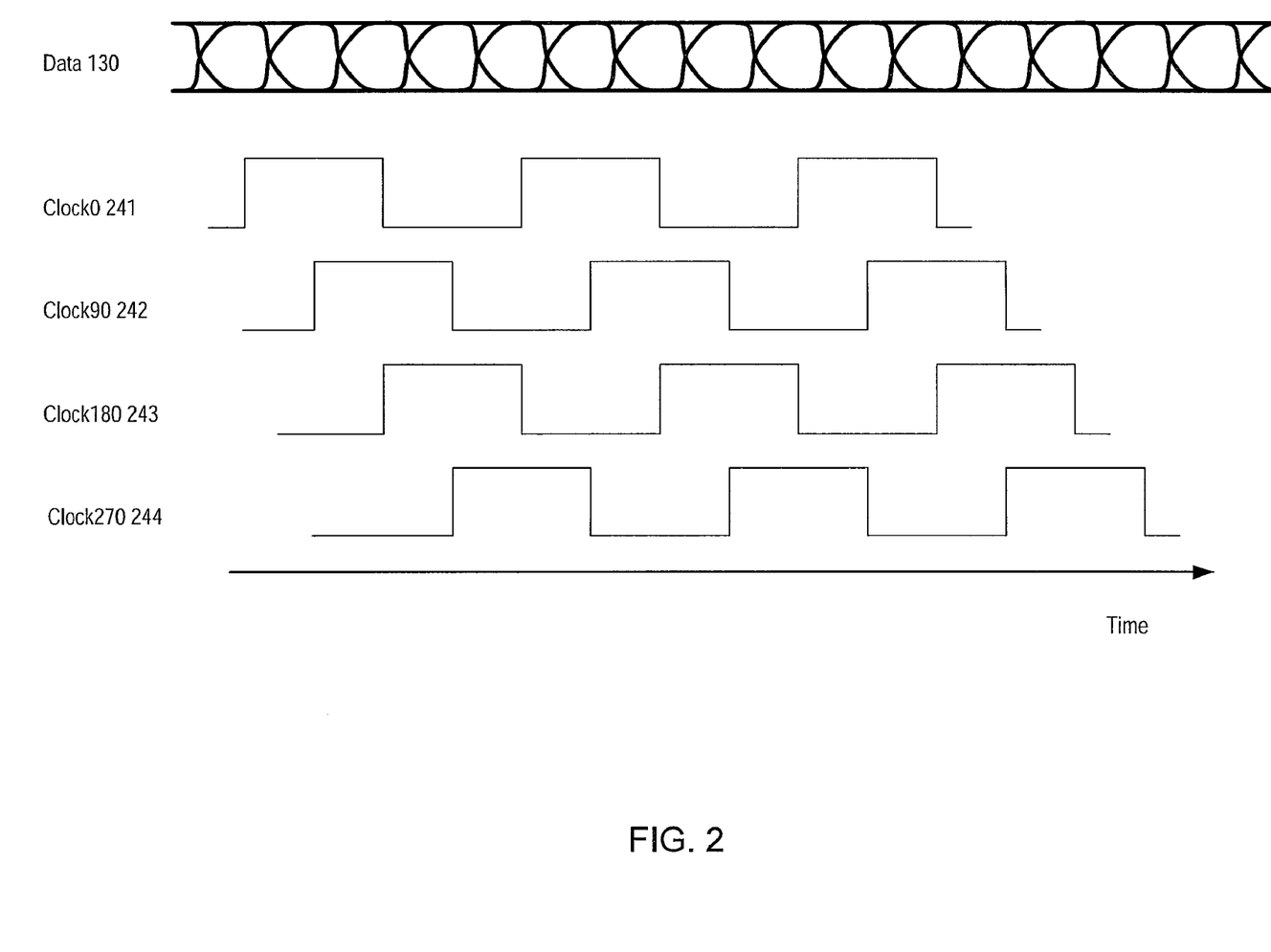
FIG. 2 illustrates a timing diagram of signals associated with one embodiment of receiver.

Turning now to FIG. 2, a timing diagram of signals associated with one embodiment of receiver 120 is shown. In the illustration, data 130 is represented as a multi-bit eye-diagram aligned with 4 clock signals having 4 different phase offsets. Each "eye" of data 130 has a period equal to one unit interval, i.e. the time between successive symbols in the channel. Four clock waveforms are also shown. The phases of the illustrated clocks may be adjusted to perform symbol-based sampling of data 130. For instance, clock0 241 has a rising edge in the middle of a first cycle of a group of four cycles of data 130, clock90 242 has a rising edge in the middle of a second cycle of a group of four cycles of data 130, clock180 243 has a rising edge in the middle of a third cycle of a group of four cycles of data 130, and clock270 244 has a rising edge in the middle of a first cycle of a group of four cycles of data 130. In one embodiment, referred to as quarter-rate clocking, each of clock0, clock 90, clock180, and clock270 has a period equal to the length of 4 cycles of data 130. In alternative embodiments, other clock rates may be used, such as eighth-rate clocking or sixteenth-rate clocking.

For a pulse in a given cycle of data 130, the middle of the cycle may be referred to as the cursor and the height of the response to a pulse in milliVolts at the cursor may be referred to as the cursor height h(0). A precursor height, h(−1), and post-cursor heights, h(1), h(2), etc, may also be defined to be the inter-symbol interference (ISI) contributions to the height of the pulse response at other mid-cycle points. For instance, h(1) may be the contribution to the pulse response one unit interval after a given pulse, h(2) may be the contribution to the pulse response two unit intervals after a given pulse, etc. The discussions that follow will show how a receiver, and in particular an error monitor such as error monitor 126 will recover a clock from data 130, determine the average height of a pulse in channel 118, and determine settings for DFE 124 and filter 115 by measuring quantities associated with data 130 at various points such as h(−1), h(0), h(1) and h(2).

Figure 3:
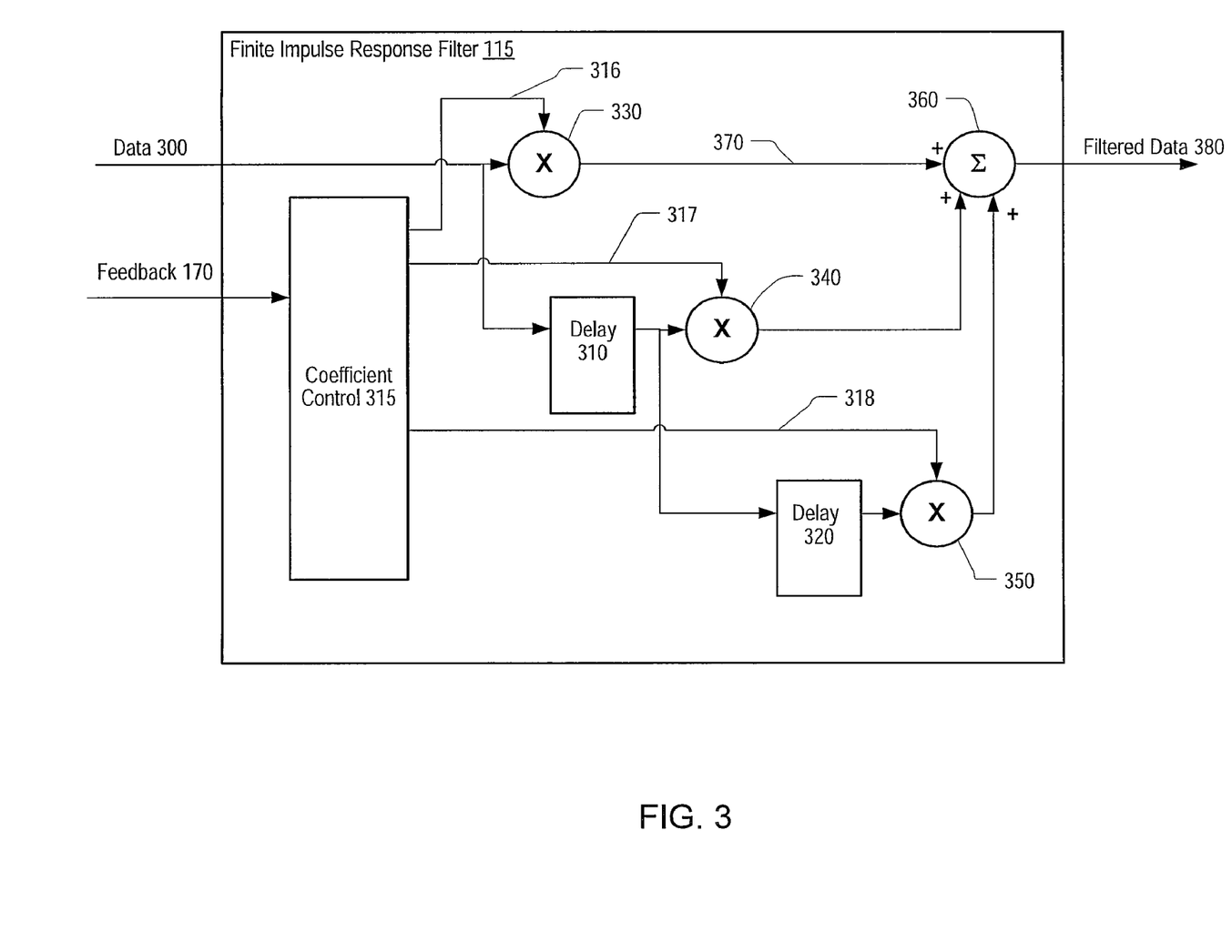
FIG. 3 illustrates one embodiment of a FIR filter having three configurable tap coefficients.

FIG. 3 illustrates one embodiment of a FIR filter 115 having three configurable tap coefficients. As shown, filter 115 includes delays 310 and 320, multipliers 330, 340, and 350, an adder 360, and coefficient control 315. Filter 115 receives data 300 and feedback 170 and outputs filtered data 380. In operation, data 300 is multiplied by a first coefficient 316 in multiplier 330, wherein the coefficient 316 is determined by coefficient control 315 based on increase/decrease signals from feedback 170. In addition, data 300 is delayed by a fixed time interval by delay 310 and multiplied by a second coefficient 317 in multiplier 340, wherein the coefficient 317 is determined by increase/decrease signals from feedback 170. The output of delay 310 is delayed further by a fixed time interval by delay 320 and multiplied by a third coefficient 318 in multiplier 350, wherein the coefficient 318 is determined by increase/decrease signals from feedback 170. In one embodiment, coefficients 316, 317, and 318 may be referred to as the post-cursor, cursor, and pre-cursor coefficients, respectively. The outputs of multipliers 330, 340, and 350 may be accumulated by adder 360 to produce filtered data 380.

In the embodiment illustrated in FIG. 3, two delays (310 and 320) are shown by way of example only. In alternative embodiments, fewer than two or more than two delays may be included in filter 115. Each delay may be associated with a respective multiplier and coefficient. In various embodiments, inputs to coefficient control 315 may be provided by the transmitter, the receiver, or some other component (not shown) of communications system 100. Unless otherwise indicated, the remainder of this application is concerned with embodiments in which feedback 170 provides values to coefficient control 315 in order to set FIR coefficients.

Figure 4:
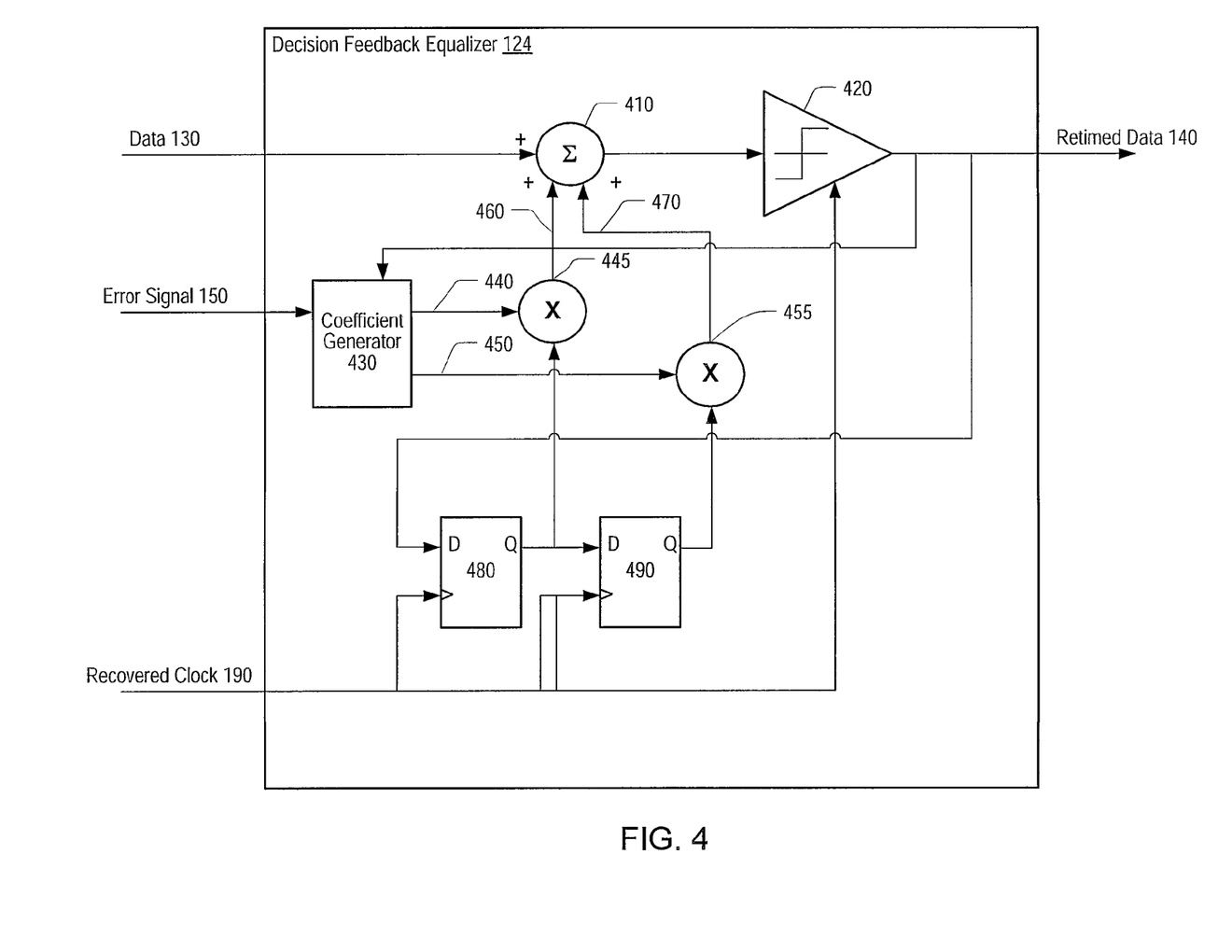
FIG. 4 is a generalized block diagram of one embodiment of a decision feedback equalizer (DFE).

FIG. 4 is a block diagram of one embodiment of DFE 124. As shown, DFE 124 includes an adder 410, a slicer 420, a coefficient generator 430, multipliers 445 and 455, and latches 480 and 490. DFE 124 may receive data 130 and recovered clock 190 and outputs retimed data 140. More specifically, during operation, slicer 420 may sample the output of adder 410 in synchronization with recovered clock 190. The output of slicer 420 may be fed back to a series of latches, 480 and 490, which store samples of retimed data 140 at time intervals of one cycle of recovered clock 190. The outputs of latches 480 and 490 are coupled to multipliers 445 and 455 respectively, where they are multiplied by coefficients 440 and 450 respectively. The outputs of multipliers 445 and 455 are added to data 130 by adder 410. In various embodiments, coefficients 440 and 450 may be generated by coefficient generator 430 through any of a number of well-known adaptation processes. For example, in one embodiment, coefficient generator 430 may include a microcontroller executing adaptive software or firmware to calculate coefficients based on error signal 150.

In the embodiment illustrated in FIG. 4, two latches (480 and 490) are shown by way of example only. In alternative embodiments, fewer than two or more than two latches may be included in DFE 124. Each latch may be associated with a respective multiplier and coefficient. Further alternative embodiments of DFE 124 will be apparent to those skilled in the art.

Figure 5:
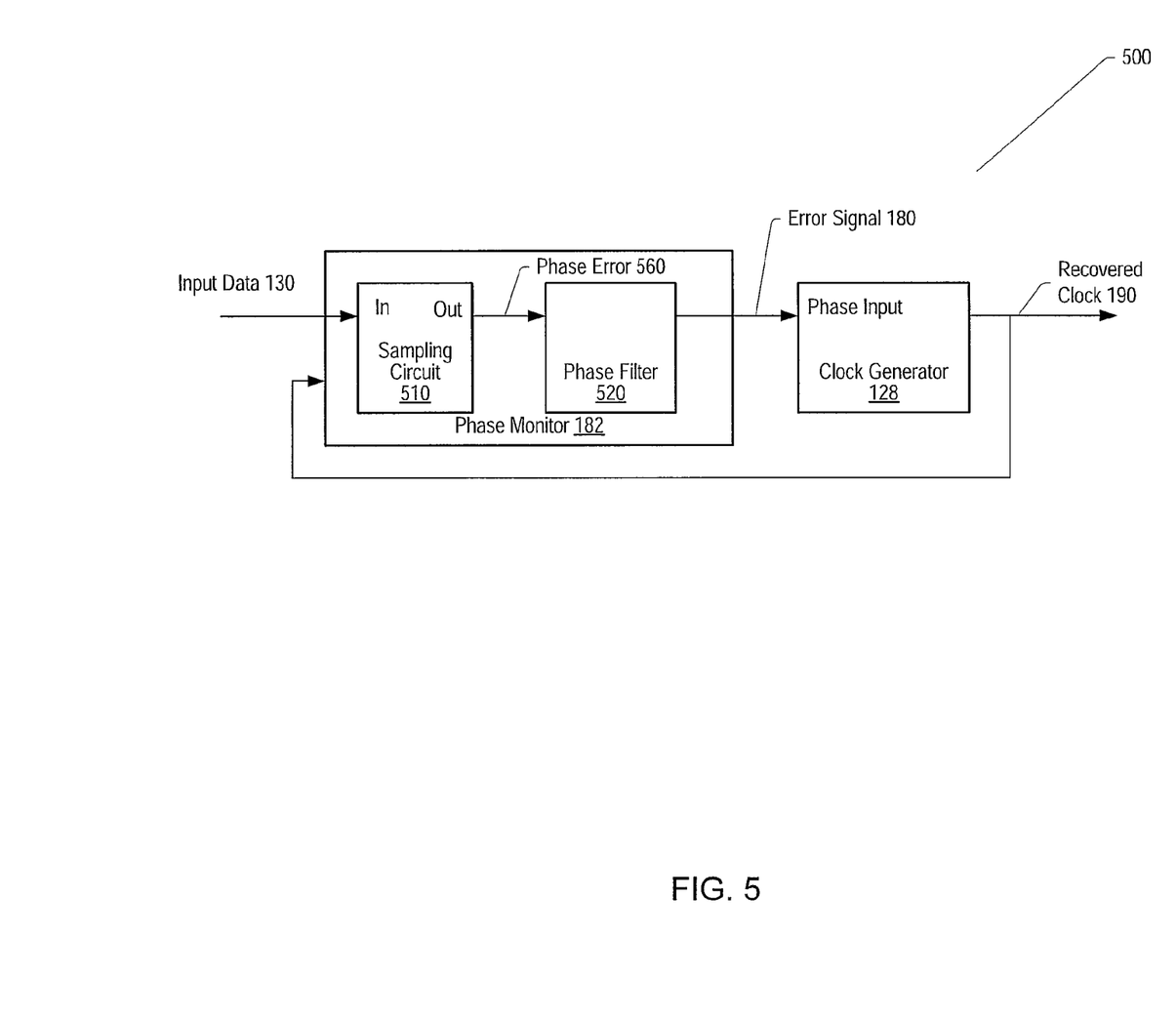
FIG. 5 illustrates one embodiment of a clock recovery subsystem.
Figure 6:
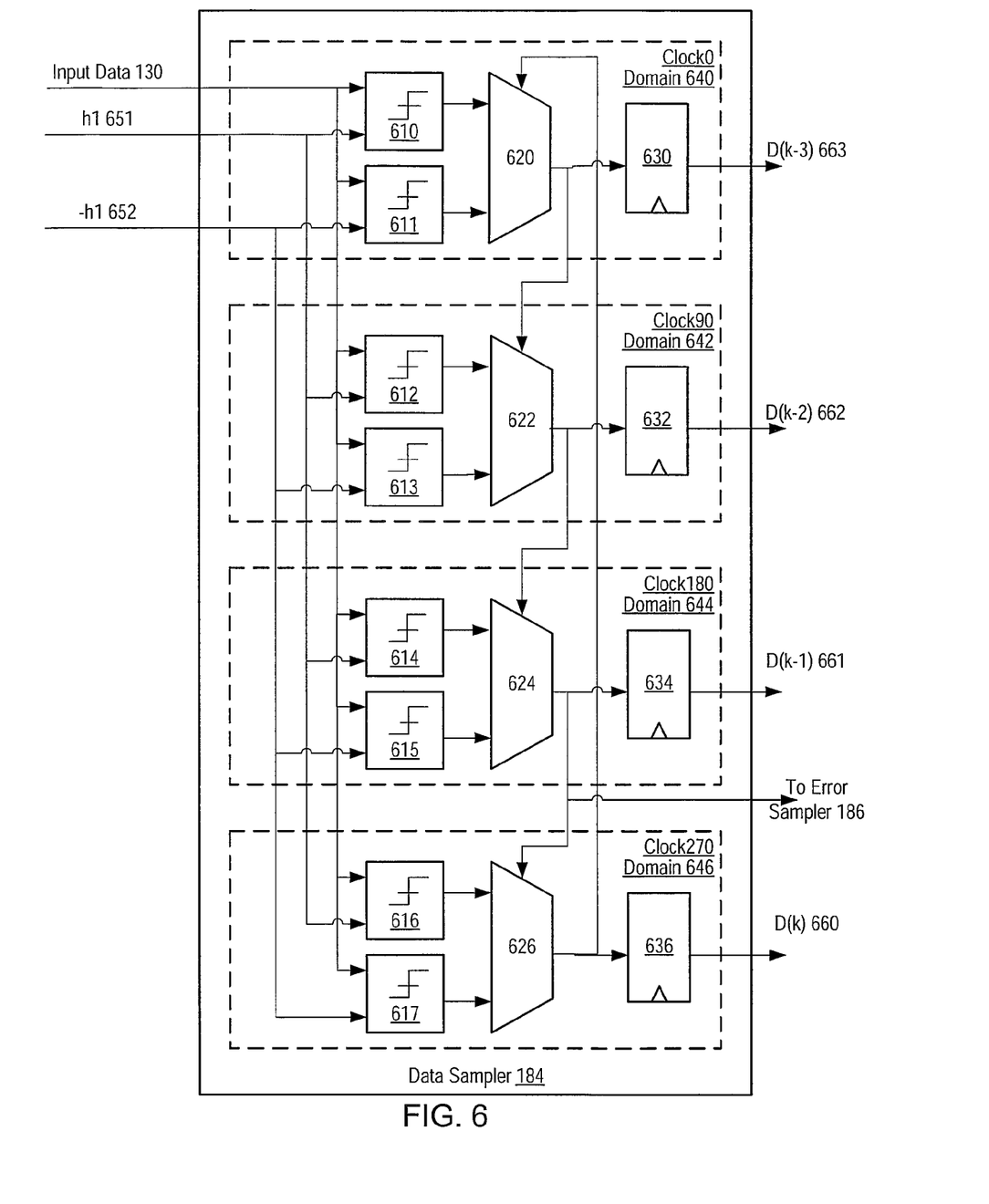
FIG. 6 illustrates one embodiment of a data sampler.
Figure 7:
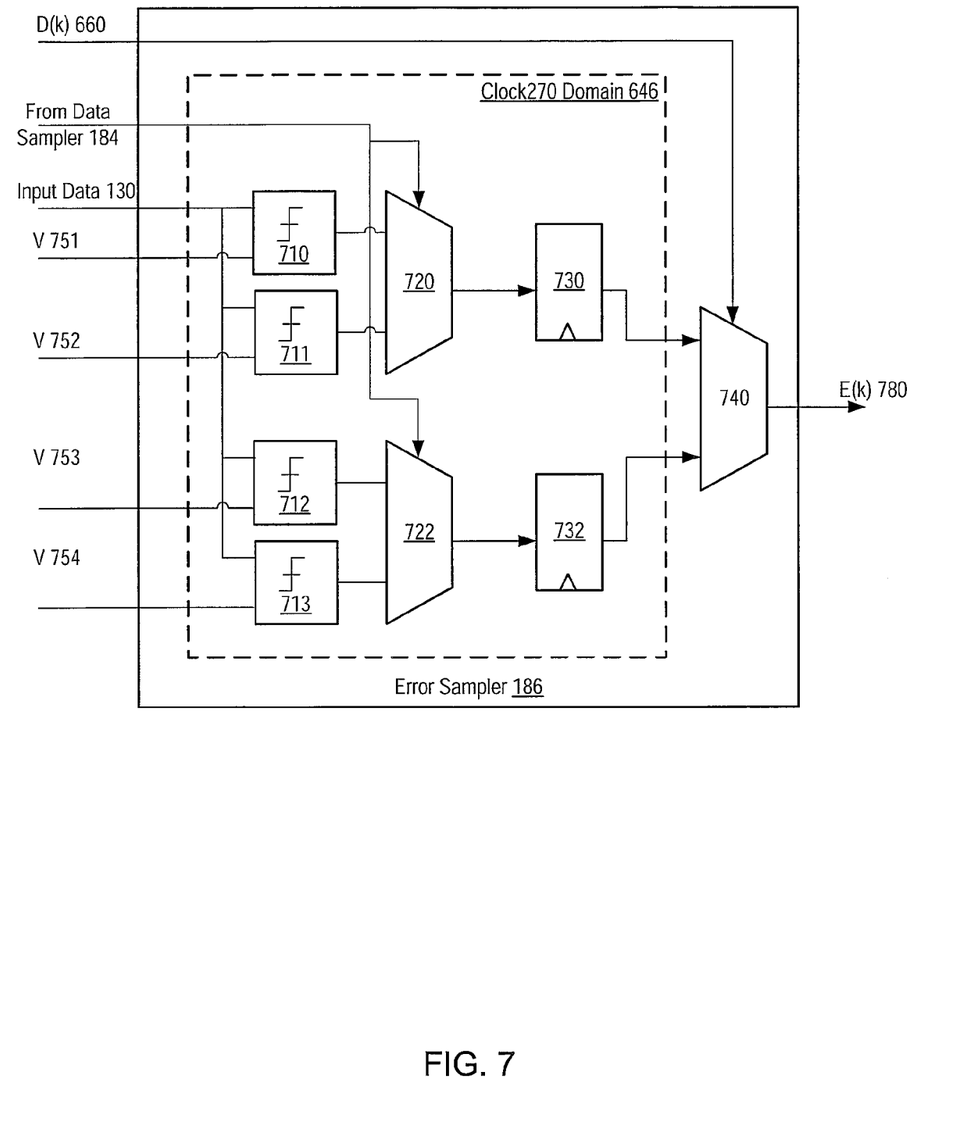
FIG. 7 illustrates one embodiment of an error sampler.

FIGS. 5, 6, and 7 illustrate implementations of components within one embodiment of error monitor 126 that may be used to generate feedback 170, signal 150, and error signal 180 for adjusting the settings of equalization parameters for FIR filter 115, DFE 124, CDR clock recovery, and the average received cursor reference voltage h0. Adaptation of these equalization parameters requires some type of algorithm based on an error signal generated within receiver 120. Before describing the implementations in FIGS. 5, 6, and 7, a discussion of one embodiment of an adaptation algorithm will be presented. In the following discussions, one embodiment of signals for adapting a single tap DFE, pre-cursor and a post cursor tap coefficients of a FIR filter, adapting a clock via a CDR, and adapting a value of h0, the average received cursor amplitude h0 are presented. In other embodiments, other coefficients such as additional FIR filter coefficients may be adapted using similar processes.

In general, clock recovery may be described in terms of a timing equation used to generate an error signal for adjusting the phase of a recovered clock. The error information that is used in clock recovery may also be used to generate error signals for DFE and FIR filter settings. One CDR timing equation is presented as equation 1:

$$\Delta t_k = E_k * D_{average}(k-1) - E_{k-1} * D_{average}(k) \quad \text{Equation 1}$$

where $\Delta t_k$ is the kth timing error, $E_k$ is an error function measured on the kth bit, and $D_{average}(k)$ is the long-term average value of the kth data bit. The long-term average of $\Delta t_k$ may be taken using a counter to generate a CDR error signal. However, implementing equation (1) requires an error function to be measured on adjacent bits. For example, if a quarter rate clock system is used to sample the data in order to generate settings for DFE and FIR, then an error function is needed on two adjacent clock phases (k and k−1). An alter-native error function that does not require an error function to be measured on adjacent bits is presented as Equation 2:

$$\Delta t_k = E_k * D_{average}(k-1) - E_{k-4} * D_{average}(k-3) \quad \text{Equation 2}$$

In equation 2, an error function is only needed on every fourth bit (k and k−4). If a quarter rate clock system is used to sample the data in order to generate settings for DFE and FIR, then an error function is only needed on one of the four clock phases. One embodiment of an error sampler that implements the error function of equation 2 is presented in FIG. 7 below.

$E_k$ and $D_{average}$ may also be used to generate feedback to the FIR filter 115, a control signal for DFE 124, and an estimate of the reference voltage h0. A number of embodiments systems and methods for adapting pre-cursor tap coefficients are described in co-pending U.S. patent application Ser. No. 12/388,233, filed Feb. 18, 2009, the entirety of which is incorporated herein by reference for all purposes. In the aforementioned application, the following equation (Equation 3) is used to generate a feedback signal for setting a value of a pre-cursor tap coefficient within FIR filter 115:

$$E_{pre}(k) = E_{pre}(k-1) + [E_{k-1} * D_{average}(k-1)] * [INC-DEC] \quad \text{Equation 3}$$

where $E_{pre}(k)$ is the kth value of the error information integrated over a period of time, $E_k$ is the error information (1 or −1), $D_{average}(k)$ is the average value of the current bit (1 or −1) and INC and DEC are the CDR clock recovery update directions. For example, in one embodiment, INC and DEC may represent results produced by integrating the output of equation 2 above.

Turning next to the DFE and post-cursor tap coefficients, it may be further shown that for a data signal x(n), the sampled incoming signal within receiver 120 may be represented as y(n) as shown in Equation 4.

$$y(n) = x(n)h(0) + x(n-1)h(1) + x(n-2)h(2) + x(n-3)h(3) \quad \text{Equation 4}$$

where h(n) represent post cursor heights following transmittal of the signal through the FIR 115 and differential channel 118, Equation 4 can be rewritten as shown in Equation 5.

$$y_e(n) = x(n-1)h(1) + x(n-2)h(2) + x(n-3)h(3) \quad \text{Equation 5}$$

where the error signal $y_e(n) = y(n) - x(n)h(0)$

Then, each side of Equation 5 can be multiplied by x(n−1), x(n−2), and x(n−3), to get Equations 6a, 6b, and 6c, respectively, where [x(n−a)*x(n−a)=1].

$$y_e(n)x(n-1) = h(1) + x(n-1)x(n-2)h(2) + x(n-1)x(n-3)h(3) \quad \text{Equation 6a}$$

$$y_e(n)x(n-2) = x(n-2)x(n-1)h(1) + h(2) + x(n-2)x(n-3)h(3) \quad \text{Equation 6b}$$

$$y_e(n)x(n-3) = x(n-3)x(n-1)h(1) + x(n-3)x(n02)h(2) + h(3) \quad \text{Equation 6c}$$

In the long-term average, x(n−a)*x(n−b) equals zero. Therefore, in the long-term average, each of Equations 6a-6c can be rewritten as shown in Equations 7a-7c, respectively.

$$\text{average}[y_e(n)x(n-1)] = h(1) \quad \text{Equation 7a}$$

$$\text{average}[y_e(n)x(n-2)] = h(2) \quad \text{Equation 7b}$$

$$\text{average}[y_e(n)x(n-3)] = h(3) \quad \text{Equation 7c}$$

In one embodiment, to achieve a well-equalized signal, the values of h(1), h(2), and h(3) may be made as small as possible by adjusting the corresponding FIR filter tap coefficients. In a further embodiment, similar arguments apply to pre-cursor height h(−1). Accordingly, error monitor 126 may be configured to estimate the values of pre-cursor height and a number of post-cursor heights and use these estimates to drive adaptation loops for FIR filter 115. To adapt CDR, a Muller-Mueller algorithm in which the lock point is at h(−1)=h(1) may be used.

It may be further shown that h(1) may be used to adapt a single-tap DFE in addition to adapting the first post-cursor tap of FIR filter 115. To adapt DFE, an algorithm that drives h(1) to zero may be used. If the absolute value of h(1) used to adapt DFE exceeds a configurable value, the value of the first post-cursor tap of FIR filter 115 may be updated accordingly as described further below.

It may be further shown that a signal for setting a single DFE tap and an FIR filter post-cursor tap coefficient may be generated using the equation:

$$h(1) = E_k * D_{average}(k-1) \qquad \text{Equation 8}$$

In addition, h0 may be estimated using the following equation:

$$h0 = D_{average}(k) \qquad \text{Equation 9}$$

The discussions that follow will use equations 2, 3, 8, and 9 to adapt values for the CDR, FIR filter pre-cursor tap coefficient, and DFE and post-cursor tap coefficients, and h0 respectively.

FIG. 5 illustrates one embodiment of a clock recovery subsystem 500. Clock recovery subsystem 500 may be implemented as a portion of receiver 120 and includes phase monitor 182 within error monitor 126 coupled to clock generator 128. In one embodiment, phase monitor 182 may include a sampling circuit 510 and a phase filter 520. In operation, input data 130 is received and sampled by sampling circuit 510 which may compare the timing of the input data's bit transitions to the transitions of a clock generated by clock generator 128. Sampling circuit 510 may produce a phase error 560 that is conveyed to phase filter 520. Phase filter 520 may filter phase error 560 and deliver an error signal 180 to clock generator 128. Error signal 180 may provide INC or DEC update directions for use in implementing equation 2, as previously described. Clock generator 128 may then adjust the phase of the clock that it generates (i.e., recovered clock 190) and delivers to other portions of receiver 120.

FIG. 6 illustrates one embodiment of a data sampler 184. In the illustrated embodiment, data sampler includes samplers 610-617, multiplexers 620, 622, 624, and 626, and latches 630, 632, 634, and 636. Samplers 610 and 611, multiplexer 620, and latch 630 are operated in a clock0 domain 640, i.e., they are clocked by clock0 241. Samplers 612 and 613, multiplexer 622, and latch 632 are operated by in a clock90 domain 642, i.e., they are clocked by clock90 242. Samplers 614 and 615, multiplexer 624, and latch 634 are operated by in a clock180 domain 644, i.e., they are clocked by clock180 243. Samplers 616 and 617, multiplexer 626, and latch 636 are operated by in a clock270 domain 646, i.e., they are clocked by clock270 244.

During operation, each of samplers 610-617 receives as inputs data 130 and a reference voltage. The reference voltage received by samplers 610, 612, 614, and 616 is h1 651, which is the average value of the first post-cursor height as a result of ISI due to transmission of a cursor bit with a value of 1. Sampler 610 outputs a '1' if the value of data 130 is greater than h1 at the sampling point of clock0 241 and a value of '0' if the value of data 130 is less than h1 at the sampling point of clock0 241. The reference voltage received by samplers 611, 613, 615, and 617 is −h1 652, which is the average value of the first post-cursor height as a result of ISI due to transmission of a cursor bit with a value of −1. Sampler 611 outputs a '1' if the value of data 130 is greater than −h1 at the sampling point of clock0 241 and a value of '0' if the value of data 130 is less than −h1 at the sampling point of clock0 241. Data sampler 184 uses quarter rate clocking to sample 4 cycle segments of data 130. The outputs of samplers 610 and 611 are conveyed to multiplexer 620, which is configured to select either the output from sampler 610 if the last bit in the previous segment had a value of '1' or the output from sampler 611 if the last bit in the previous segment had a value of '0'. Similarly, the outputs of samplers 612 and 613 are conveyed to multiplexer 622, which is configured to select either the output from sampler 612 if the previous bit in the segment had a value of '1' or the output from sampler 613 if the previous bit in the segment had a value of '0'. Samplers 614-617 and multiplexers 624 and 626 are similarly configured. The outputs of multiplexers 620, 622, 624, and 626 are coupled to latches 630, 632, 634, and 636, respectively, which provide outputs D(k−3) 663, D(k−2) 662, D(k−1) 661, and D(k) 660, respectively. The output of multiplexer 624, which is used to drive multiplexer 626, is also provided to error sampler 186, in which it is used to drive additional multiplexers.

FIG. 7 illustrates one embodiment of an error sampler 186. In the illustrated embodiment, error sampler 186 includes samplers 710-713, multiplexers 720, 722, and 740, and latches 730 and 732. All of the elements in error sampler 186 are operated in a clock270 domain 646, i.e., they are clocked by clock270 244. During operation, each of samplers 710-713 receives as inputs data 130 and a reference voltage. The reference voltage received by sampler 710, V 751, has a value equal to h0+h1. Sampler 710 outputs a '1' if the value of data 130 is greater than h0+h1 at the sampling point of clock270 244 and a value of '0' if the value of data 130 is less than h0+h1 at the sampling point of clock270 244. The reference voltage received by sampler 711, V 752, has a value equal to h0−h1. Sampler 711 outputs a '1' if the value of data 130 is greater than h0−h1 at the sampling point of clock270 244 and a value of '0' if the value of data 130 is less than h0−h1 at the sampling point of clock270 244. The reference voltage received by sampler 712, V 753, has a value equal to −(h0−h1). Sampler 712 outputs a '1' if the value of data 130 is greater than −(h0−h1) at the sampling point of clock270 244 and a value of '0' if the value of data 130 is less than −(h0−h1) at the sampling point of clock270 244. The reference voltage received by sampler 713, V 754, has a value equal to −(h0+h1). Sampler 713 outputs a '1' if the value of data 130 is greater than −(h0+h1) at the sampling point of clock270 244 and a value of '0' if the value of data 130 is less than −(h0+h1) at the sampling point of clock270 244. Error sampler 186 may receive a signal from data sampler 184 that indicates the most recent symbol value sampled by clock180 243. Error sampler 186 may use this signal to drive multiplexers 720 and 722. More particularly, the outputs of samplers 710 and 711 may be conveyed to multiplexer 720, which is configured to select either the output from sampler 710 if the most recent symbol value sampled by clock180 243 has a value of '1' or the output from sampler 711 if the most recent symbol value sampled by clock180 243 has a value of '0'. Similarly, the outputs of samplers 712 and 713 are conveyed to multiplexer 722, which is configured to select either the output from sampler 712 if the most recent symbol value sampled by clock180 243 has a value of '1' or the output from sampler 713 if the most recent symbol value sampled by clock180 243 has a value of '0'. The outputs of multiplexers 720 and 722 are coupled to latches 730 and 732, respectively, which provide inputs to multiplexer 740. Error sampler 186 may receive a signal, D(k) 660, from data sampler 184 that indicates the most recent data signal derived by clock279 244. Error sampler 186 may use this signal to drive multiplexer 740. More particularly, the outputs of latches 730 and 732 may be conveyed to multiplexer 740, which is configured to select either the output from latch 730 if the most recent data signal derived by clock279 244 has a value of '1' or the output from latch 732 if the most recent data signal derived by clock279 244 has a value of '0'. The output of multiplexer 740 is E(k) 780.

The above discussions have illustrated embodiments of circuitry within error monitor 126 that may be used to implement the algorithms corresponding to equations 2, 3, 8, and 9. Within error monitor 126, each of the quantities determined by equations 2, 3, 8, and 9 may be integrated over a period of time using a counter (not shown) to determine an update direction for the CDR clock phase, a pre-cursor tap coefficient within FIR filter, a DFE tap coefficient and an FIR filter post-cursor tap coefficient, and a value of h0, respectively. If $\Delta t_k$ is positive at the end of the integration period, the value of CDR clock phase may be increased. If $\Delta t_k$ is negative at the end of the integration period, the value of CDR clock phase may be decreased. If $E_{pre}(k)$ is positive at the end of the integration period, the value of the pre-cursor tap coefficient may be increased. If $E_{pre}(k)$ is negative at the end of the integration period, the value of the pre-cursor tap coefficient may be decreased. If h(1) is positive at the end of the integration period, the value of either the a DFE tap coefficient or the FIR filter post-cursor tap coefficient may be increased. If h(1) is negative at the end of the integration period, the value of either the a DFE tap coefficient or the FIR filter post-cursor tap coefficient may be decreased. If $D_{average}(k)$ is positive at the end of the integration period, the value of the pre-cursor tap coefficient may be decreased. If $D_{average}(k)$ is negative at the end of the integration period, the value of the pre-cursor tap coefficient may be increased.

In one embodiment, equations 2, 3, 8, and 9 may be implemented using common logic elements and an up/down counter to integrate the value of the error information over a predetermined period of time. For example, functions $E_{pre}(k)$ and $D_{average}(k)$ having values of 1 or −1 in equation (3), may be implemented as e(i) and e(i), having values of '0' or '1.' Using e(i) and e(i) in place of $E_{pre}(i)$ and $D_{average}(i)$ and using separate expressions for the INC and DEC update directions, a FIR precursor tap coefficient may be determined based on the following equations:

$$Up(i)=[e(i-1)XNOR\ d(i-1)]\ XOR\ INC \qquad (2)$$

$$Down(i)=[e(i-1)XNOR\ d(i-1)]\ XOR\ DEC, \qquad (3)$$

where Up(i) and Down(i) are inputs to the up/down counter.

Figure 8:
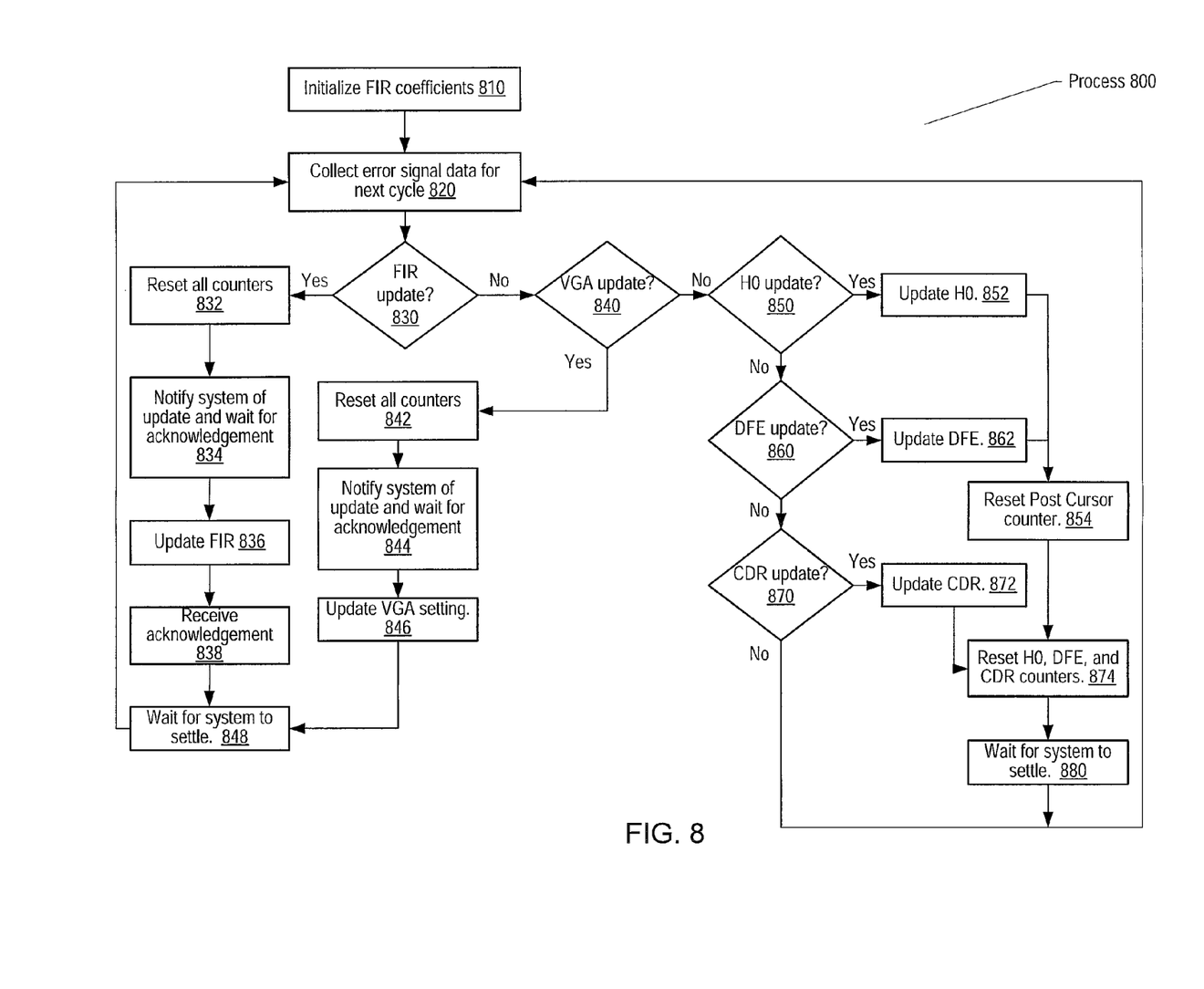
FIG. 8 illustrates one embodiment of a process that may be used for equalization and CDR adaptation using a single-phase error sampler

FIG. 8 illustrates one embodiment of a process 800 that may be used for equalization and CDR adaptation using a single-phase error sampler. Process 800 may begin with initialization of all FIR coefficients (block 810). For instance, all FIR coefficients may be adjusted to match a predetermined set of default values. Next, samples may be taken from a data signal during the four clock cycles (block 820). In one embodiment, sampled quantities may include integrated values of $\Delta t_k$, $E_{pre}(k)$, h(1), and $D_{average}(k)$. Once these samples have been taken, a determination may be made of whether or not there are any FIR tap coefficient updates to be made (decision block 830). Decision block 830 is further described in FIG. 9 and the accompanying description below. If there are FIR tap coefficient updates to be made, all integrating counters may be reset (block 832). The data communication system may then be notified that an update is pending (block 834). Once the data communication system acknowledges the update notification, FIR tap coefficient updates may be applied (block 836). For example, the data communication system may take precautions to avoid loss of data during an update, including temporarily halting the transfer of data. After completion of the FIR tap coefficient updates, an acknowledgement may be received by the adaptation system (block 838). In response to receiving the update acknowledgement, a blanking period may be entered to allow the data communication system to settle (block 848). In one embodiment, the duration of the blanking period may be configurable via software or user input, etc. After the blanking period, another set of samples may be taken from a data signal during the four clock cycles (block 820).

If there are not any FIR tap coefficient updates to be made (decision block 830), a determination may be made of whether or not there are any VGA updates to be made (decision block 840). For example, the VGA gain may be increased if the value of h0 reaches a lower limit and increased if the value of h0 reaches an upper limit. If a VGA update is indicated, all integrating counters may be reset (block 842). The data communication system may then be notified that an update is pending (block 844). Once the data communication system acknowledges the update notification, VGA updates may be applied (block 846). For example, the data communication system may take precautions to avoid loss of data during an update, including temporarily halting the transfer of data. After completion of the VGA updates, a blanking period may be entered to allow the data communication system to settle (block 848). In one embodiment, the duration of the blanking period may be configurable via software or user input, etc. After the blanking period, another set of samples may be taken from a data signal during the four clock cycles (block 820).

If there are not any VGA updates to be made (decision block 840), a determination may be made of whether or not there are any h0 updates to be made (decision block 850). If so, h0 updates may be applied (block 852). After completion of the h0 updates, the FIR filter post-cursor tap integration counter may be reset (block 854). Then, the h0, DFE, and CDR integration counters may be reset (block 874). After the counters have been reset, a blanking period may be entered to allow the data communication system to settle (block 880). In one embodiment, the duration of the blanking period may be configurable via software or user input, etc. After the blanking period, another set of samples may be taken from a data signal during the four clock cycles (block 820).

If there are not any h0 updates to be made (decision block 850), a determination may be made of whether or not there are any DFE updates to be made (decision block 860). If so, DFE updates may be applied (block 862). After completion of the DFE updates, the FIR filter post-cursor tap integration counter may be reset (block 854). Then, the h0, DFE, and CDR integration counters may be reset (block 874). After the counters have been reset, a blanking period may be entered to allow the data communication system to settle (block 880). In one embodiment, the duration of the blanking period may be configurable via software or user input, etc. After the blanking period, another set of samples may be taken from a data signal during the four clock cycles (block 820).

If there are not any DFE updates to be made (decision block 860), a determination may be made of whether or not there are any CDR updates to be made (decision block 870). If so, CDR updates may be applied (block 872). After completion of the CDR updates, the h0, DFE, and CDR integration counters may be reset (block 874). After the counters have been reset, a blanking period may be entered to allow the data communication system to settle (block 880). In one embodiment, the duration of the blanking period may be configurable via software or user input, etc. After the blanking period, another set of samples may be taken from a data signal during the four clock cycles (block 820).

Figure 9:
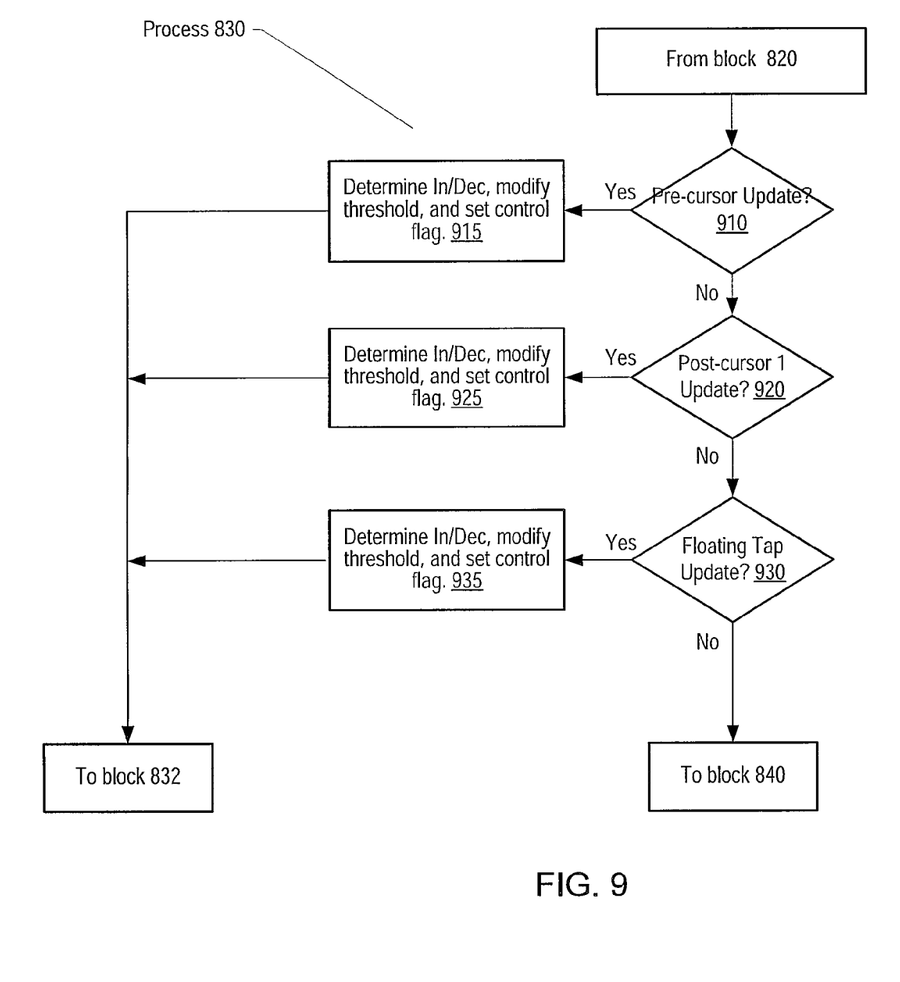
FIG. 9 illustrates one embodiment of a process that may be used to determine updates for FIR tap coefficient values.

FIG. 9 illustrates one embodiment of a process 830 that may be used to determine updates for FIR tap coefficient values. Process 830 may begin after samples are taken from a data signal during four clock cycles (block 820 of process 800). A determination may be made of whether or not there are any pre-cursor tap updates to be made (decision block 910). If so, updates may be applied (block 915). In one embodiment, updates include determining which direction to update the pre-cursor tap, how much to modify the threshold for triggering an update, and whether or not to set a pre-cursor control flag. In one embodiment, the threshold may have an initial value of 2^0. In a further embodiment, the pre-cursor control flag may be set to prevent looping forever in the pre-cursor update. Such looping may occur if the value of another adaptation parameter is out of range. By setting the pre-cursor control flag to skip the pre-cursor update, the adaptation of the out-of-range parameter may be allowed to proceed. Once the out-of-range condition is corrected, the pre-cursor control flag may be reset. For example, in one embodiment, a pre-cursor update may be indicated if $E_{pre}(k)$ exceeds a threshold value and the pre-cursor control flag is not set. In a further embodiment, the pre-cursor control flag may be set after a pre-cursor decrement while the pre-cursor value is greater than or equal to zero and reset after a post-cursor update. After the updates have been applied, flow may continue at block 832.

If there are not any pre-cursor tap updates to be made (decision block 910), a determination may be made of whether or not there are any first post-cursor tap updates to be made (decision block 920). If so, updates may be applied (block 925). In one embodiment, updates include determining which direction to update the first post-cursor tap, how much to modify the thresholds for triggering an update, and whether or not to set a first post-cursor control flag. In one embodiment, a first, low threshold and a second, high threshold may be maintained. If the integrated value of h(1) lies between the two thresholds, equalization may be shared between the FIR filter first post-cursor and the DFE. Otherwise, equalization may be performed using only the FIR filter, not the DFE. In a further embodiment, the first post-cursor control flag may be set to prevent looping forever in the first post-cursor update. Such looping may occur if the value of another adaptation parameter is out of range. By setting the first post-cursor control flag to skip the first post-cursor update, the adaptation of the out-of-range parameter may be allowed to proceed. Once the out-of-range condition is corrected, the first post-cursor control flag may be reset. For example, in one embodiment, a post-cursor update may be indicated if def1/h0>dfe_max or def1/h0<dfe_min and the post-cursor control flag is not set, where def1 is the value of the DFE post-cursor tap coefficient and dfe_max and dfe_min are configurable threshold values of def1. Dfe_max may be set to a value to limit error propagation. Dfe_min may be set to a value that determines when to share equalization between the FIR filter first post-cursor and the DFE post-cursor coefficients. In a further embodiment, the post-cursor control flag may be set after a first post-cursor increment while the first post-cursor value is greater than or equal to zero and reset after a pre-cursor update. After the updates have been applied, flow may continue at block 832.

If there are not any first post-cursor tap updates to be made (decision block 920), a determination may be made of whether or not there are any other FIR tap updates to be made (decision block 930). Other FIR taps may be referred to as floating taps. In one embodiment, a floating tap refers to a tap some number of unit intervals later than the first post-cursor tap. If another FIR tap update is to be made, updates may be applied (block 935). In one embodiment, updates include determining which direction to update the floating tap, how much to modify the thresholds for triggering an update, and whether or not to set a floating tap control flag. In one embodiment, a threshold may be maintained that indicates whether or not there have been updates to either the pre-cursor tap or the first post-cursor tap in the last two update cycles. A floating tap update may be permitted only if there have not been updates to either the pre-cursor tap or the first post-cursor tap in the last two update cycles. In one embodiment, floating tap values are not sensitive to pre-post-cursor tap settings, but are sensitive to CDR settings. Consequently, the floating tap control flag may be set to prevent updates to the floating tap after CDR convergence. For example, the floating tap control flag may be set after the floating tap counter fails to reach a threshold value after two consecutive update cycles and reset after a link reset. After the updates have been applied, flow may continue at block 832. If there are not any FIR updates to be made, flow may continue at block 840.

It is noted that the foregoing flow charts are for purposes of discussion only. In alternative embodiments, the elements depicted in the flow charts may occur in a different order, or in some cases concurrently. Additionally, some of the flow chart elements may not be present in various embodiments, or may be combined with other elements. All such alternatives are contemplated.

It is further noted that the above-described embodiments may comprise software. For example, the functionality of FIR 115 and receiver 120 may be implemented in hardware, software, firmware, or some combination of the above. In such embodiments, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A receiver configured to recover data from an input data signal, wherein the receiver comprises circuitry configured to:
    receive a data signal, the data signal having been filtered by a finite impulse response (FIR) filter;
    determine an error signal based on an error sample taken from the data signal in a single clock cycle; and
    convey a feedback signal based on the error signal which may be used to adapt settings of two or more of the following:
        one or more post-cursor tap coefficients of the FIR;
        a phase of a recovered clock; and
        a coefficient of a decision feedback equalizer (DFE);
    wherein to determine an error signal, the circuitry is configured to sample the data signal received at a phase estimated to correspond to a peak amplitude of a pulse response of a channel via which the data signal is received, wherein the phase is based on the recovered clock.

2. The receiver of claim 1, wherein the error signal comprises a measurement of an amount of inter-symbol interference (ISI) within the data signal.

3. The receiver of claim 1, wherein for each of the settings the receiver is further configured to integrate a respective one of a plurality of quantities, each quantity derived from a plurality of error samples, each error sample taken from the data signal in a single clock cycle.

4. The receiver of claim 3, wherein the receiver is further configured to adapt the post-cursor tap coefficient of the FIR and the coefficient of the DFE based on a same one of the plurality of quantities.

5. The receiver of claim 1, wherein the circuitry is further configured to:
increase a pre-cursor tap coefficient setting in response to determining that the phase of the recovered clock corresponds to a point earlier than a peak amplitude of the pulse response of the channel; and
decrease a pre-cursor tap coefficient setting in response to determining that the phase of the recovered clock corresponds to a point later than the peak amplitude of the pulse response of the channel.

6. The receiver of claim 1, wherein the receiver is integrated into a serializer/deserializer.

7. A method of recovering data from an input data signal, the method comprising:
receiving a data signal, the data signal having been filtered by a finite impulse response (FIR) filter;
determining an error signal based on an error sample taken from the data signal in a single clock cycle; and
conveying a feedback signal based on the error signal which may be used to adapt settings of two or more of the following:
one or more post-cursor tap coefficients of the FIR;
a phase of a recovered clock; and
a coefficient of a decision feedback equalizer (DFE);
wherein to determine an error signal further comprises sampling the data signal received via a channel at a phase estimated to correspond to a peak amplitude of a pulse response of the channel, wherein the phase is based on the recovered clock.

8. The method of claim 7, wherein the error signal comprises a measurement of an amount of inter-symbol interference (ISI) within the data signal.

9. The method of claim 7, wherein for each setting the method further comprises integrating a respective one of a plurality of quantities, each quantity derived from a plurality of error samples, each error sample taken from the data signal in a single clock cycle.

10. The method of claim 9, further comprising adapting the post-cursor tap coefficient of the FIR and the coefficient of the DFE based on a same one of the plurality of quantities.

11. The method of claim 7, further comprising:
increasing a pre-cursor tap coefficient setting in response to determining that the phase corresponds to a point earlier than a peak amplitude of the pulse response of the channel; and
decreasing a pre-cursor tap coefficient setting in response to determining that the phase corresponds to a point later than the peak amplitude of the pulse response of the channel.

12. A data communications system comprising:
a transmitter configured to convey a data signal filtered by a finite impulse response (FIR) filter via a channel; and
a receiver configured to:
receive the data signal via the channel;
determine an error signal based on an error sample taken from the data signal in a single clock cycle; and
convey a feedback signal based on the error signal which may be used to adapt settings of two or more of the following:
one or more post-cursor tap coefficients of the FIR;
a phase of a recovered clock; and
a coefficient of a decision feedback equalizer (DFE);
wherein to determine an error signal, the receiver is further configured to sample the data signal received via the channel at a phase estimated to correspond to a peak amplitude of a pulse response of the channel, wherein the phase is based on the recovered clock.

13. The system of claim 12, wherein the error signal comprises a measurement of an amount of inter-symbol interference (ISI) within the data signal received via the channel.

14. The system of claim 12, wherein for each setting the receiver is further configured to integrate a respective one of a plurality of quantities, each quantity derived from a plurality of error samples, each error sample taken from the data signal in a single clock cycle.

15. The system of claim 14, wherein the receiver is further configured to adapt the post-cursor tap coefficient of the FIR and the coefficient of the DFE based on a same one of the plurality of quantities.

16. The system of claim 12, wherein the circuitry is further configured to:
increase a pre-cursor tap coefficient setting in response to determining that the phase corresponds to a point earlier than a peak amplitude of the pulse response of the channel; and
decrease a pre-cursor tap coefficient setting in response to determining that the phase corresponds to a point later than the peak amplitude of the pulse response of the channel.

17. The system of claim 12, wherein the receiver is integrated into a serializer/deserializer.

18. A receiver configured to recover data from an input data signal, wherein the receiver comprises circuitry configured to:
receive a data signal, the data signal having been filtered by a finite impulse response (FIR) filter;
determine an error signal based on an error sample taken from the data signal in a single clock cycle; and
convey a feedback signal based on the error signal which may be used to adapt settings of two or more of the following:
one or more post-cursor tap coefficients of the FIR;
a phase of a recovered clock; and
a coefficient of a decision feedback equalizer (DFE);
wherein for each of the settings the receiver is further configured to integrate a respective one of a plurality of quantities, each quantity derived from a plurality of error samples, each error sample taken from the data signal in a single clock cycle.

19. A receiver configured to recover data from an input data signal, wherein the receiver comprises circuitry configured to:
receive a data signal, the data signal having been filtered by a finite impulse response (FIR) filter;
determine an error signal based on an error sample taken from the data signal in a single clock cycle; and
convey a feedback signal based on the error signal which may be used to adapt settings of two or more of the following:
one or more post-cursor tap coefficients of the FIR;
a phase of a recovered clock; and a coefficient of a decision feedback equalizer (DFE);
wherein the circuitry is further configured to:
increase a pre-cursor tap coefficient setting in response to determining that the phase of the recovered clock corresponds to a point earlier than a peak amplitude of the pulse response of the channel; and
decrease a pre-cursor tap coefficient setting in response to determining that the phase of the recovered clock corresponds to a point later than the peak amplitude of the pulse response of the channel.

20. A method of recovering data from an input data signal, the method comprising:
receiving a data signal, the data signal having been filtered by a finite impulse response (FIR) filter;
determining an error signal based on an error sample taken from the data signal in a single clock cycle; and
conveying a feedback signal based on the error signal which may be used to adapt settings of two or more of the following:
one or more post-cursor tap coefficients of the FIR;
a phase of a recovered clock; and
a coefficient of a decision feedback equalizer (DFE);
wherein for each setting the method further comprises integrating a respective one of a plurality of quantities, each quantity derived from a plurality of error samples, each error sample taken from the data signal in a single clock cycle.

21. A method of recovering data from an input data signal, the method comprising:
receiving a data signal, the data signal having been filtered by a finite impulse response (FIR) filter;
determining an error signal based on an error sample taken from the data signal in a single clock cycle; and
conveying a feedback signal based on the error signal which may be used to adapt settings of two or more of the following:
one or more post-cursor tap coefficients of the FIR;
a phase of a recovered clock; and
a coefficient of a decision feedback equalizer (DFE);
increasing a pre-cursor tap coefficient setting in response to determining that the phase corresponds to a point earlier than a peak amplitude of the pulse response of the channel; and
decreasing a pre-cursor tap coefficient setting in response to determining that the phase corresponds to a point later than the peak amplitude of the pulse response of the channel.

22. A data communications system comprising:
a transmitter configured to convey a data signal filtered by a finite impulse response (FIR) filter via a channel; and
a receiver configured to:
receive the data signal via the channel;
determine an error signal based on an error sample taken from the data signal in a single clock cycle; and
convey a feedback signal based on the error signal which may be used to adapt settings of two or more of the following:
one or more post-cursor tap coefficients of the FIR;
a phase of a recovered clock; and
a coefficient of a decision feedback equalizer (DFE);
wherein for each setting the receiver is further configured to integrate a respective one of a plurality of quantities, each quantity derived from a plurality of error samples, each error sample taken from the data signal in a single clock cycle.

23. A data communications system comprising:
a transmitter configured to convey a data signal filtered by a finite impulse response (FIR) filter via a channel; and
a receiver configured to:
receive the data signal via the channel;
determine an error signal based on an error sample taken from the data signal in a single clock cycle; and
convey a feedback signal based on the error signal which may be used to adapt settings of two or more of the following:
one or more post-cursor tap coefficients of the FIR;
a phase of a recovered clock; and
a coefficient of a decision feedback equalizer (DFE);
increase a pre-cursor tap coefficient setting in response to determining that the phase corresponds to a point earlier than a peak amplitude of the pulse response of the channel; and
decrease a pre-cursor tap coefficient setting in response to determining that the phase corresponds to a point later than the peak amplitude of the pulse response of the channel.

* * * * *